(12) United States Patent
Biyani (10) Patent No.: US 11,627,003 B2
(45) Date of Patent: Apr. 11, 2023

(54) SYSTEMS AND METHODS FOR A BLOCKCHAIN MULTI-CHAIN SMART CONTRACT TIME ENVELOPE

(71) Applicant: SmartAxiom, Inc., Fullerton, CA (US)

(72) Inventor: Amit Biyani, Fullerton, CA (US)

(73) Assignee: SmartAxiom, Inc., Fullerton, CA (US)

( * ) Notice: Subject to any disclaimer, the term of this patent is extended or adjusted under 35 U.S.C. 154(b) by 431 days.

(21) Appl. No.: 16/293,538

(22) Filed: Mar. 5, 2019

(65) Prior Publication Data

US 2019/0273623 A1 Sep. 5, 2019

Related U.S. Application Data

(60) Provisional application No. 62/638,839, filed on Mar. 5, 2018.

(51) Int. Cl.
*H04L 29/06* (2006.01)
*H04L 9/32* (2006.01)
(Continued)

(52) U.S. Cl.
CPC .............. *H04L 9/3297* (2013.01); *H04L 9/12* (2013.01); *H04L 9/3239* (2013.01);
(Continued)

(58) Field of Classification Search
CPC ....... H04L 9/3297; H04L 9/3247; H04L 9/12; H04L 9/3239; H04L 9/50; H04L 2209/805
See application file for complete search history.

(56) References Cited

U.S. PATENT DOCUMENTS

| 10,673,617 B1 | 6/2020 | Antoniou et al. |
| 2017/0046792 A1 | 2/2017 | Haldenby et al. |

(Continued)

OTHER PUBLICATIONS

Kouicem et al., "Distributed Fine-Grained Secure Control of Smart Actuators in Internet of Things," IEEE International Symposium on Parallel and Distributed Processing with Applications and 2017 IEEE International Conference on Ubiquitous Computing and Communications,, 2017, pp. 653-660. (Year 2017).
(Continued)

*Primary Examiner* — Joseph P Hirl
*Assistant Examiner* — Leynna Truvan
(74) *Attorney, Agent, or Firm* — Mahesh Law Group PC; Kumar Maheshwari (57) ABSTRACT

A system for a shared and synchronous time series identification that matches a hardware clock-generating signal of a blockchain identified node device, with a generated data event time stamp and shared by all computing nodes participating in a complete system based on a blockchain design pattern and protocol. A blockchain cybersecurity system time signature is applied to synchronize the device level ID or device chain; this time sync is matched to the client master clocking time signal governing data transactions on the data event level or event chain. The combination of these two disparate blockchain mechanisms is termed as a multi-chain application. The matched time signals now provide referenced smart contract time sequencing. This matched time sequencing is unique and customized in its application to a multi-chain block chain cyber security application.

13 Claims, 8 Drawing Sheets

(51) Int. Cl.
*H04L 9/12* (2006.01)
*H04L 9/00* (2022.01)

(52) U.S. Cl.
CPC .............. *H04L 9/3247* (2013.01); *H04L 9/50* (2022.05); *H04L 2209/805* (2013.01)

(56) References Cited

U.S. PATENT DOCUMENTS

| | | |
|---|---|---|
| 2017/0147808 A1* | 5/2017 | Kravitz ................. H04L 9/0844 |
| 2017/0163733 A1* | 6/2017 | Grefen .................... H04L 67/53 |
| 2017/0243193 A1 | 8/2017 | Manian et al. |
| 2017/0300978 A1* | 10/2017 | Narasimhan ....... G06Q 20/3829 |
| 2018/0241551 A1* | 8/2018 | Fujimura .............. H04L 9/0637 |
| 2018/0268386 A1 | 9/2018 | Wack et al. |
| 2019/0097819 A1 | 3/2019 | Woodcock, IV |
| 2019/0180276 A1 | 6/2019 | Lee et al. |
| 2019/0253434 A1 | 8/2019 | Biyani et al. |
| 2019/0386969 A1 | 12/2019 | Verzun et al. |
| 2019/0394050 A1 | 12/2019 | Goeringer et al. |
| 2020/0021443 A1* | 1/2020 | Falk ...................... H04L 9/3247 |
| 2020/0126050 A1 | 4/2020 | Savolainen |
| 2020/0213306 A1 | 7/2020 | Thomsen |

OTHER PUBLICATIONS

Wang et al., "Blockchain router a cross-chain communication protocol." Proceedings of the 6th international conference on informatics, environment, energy and applications. 2017. pp. 94-97. (Year 2017).

Walker et al.,"Platibart: a platform for transactive iot blockchain applications with repeatable testing." Proceedings of the 4th Workshop on Middleware and Applications for the Internet of Things. 2017. pp. 17-22. (Year 2017).

Banafa, "IoT and blockchain convergence: benefits and challenges." IEEE Internet ofThings (2017). (Year: 2017), pp. 1-11.

* cited by examiner

SYSTEMS AND METHODS FOR A BLOCKCHAIN MULTI-CHAIN SMART CONTRACT TIME ENVELOPE

CROSS REFERENCE TO RELATED APPLICATIONS

This application claims benefit of U.S. Provisional Patent Application No. 62/638,839 filed on Mar. 5, 2018, entitled as "Blockchain Multi-chain Smart Contract Time Envelope", which is incorporated herein by reference in its entirety.

FIELD

The present disclosure generally relates to Blockchain technology for use in an IOT (Internet of Things) environment.

BACKGROUND

Currently, Blockchain technology is a growing area of interest for many organizations, in both the public and private sectors.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

In an embodiment of the disclosure, a computer-based method for accessing, by a processor, a data file shared by all computing nodes participating in a system based on a blockchain design pattern protocol is described. The data file including transactions and blocks, where the transactions are data to be stored in the blockchain and the blocks are records that confirm when, by time signal, and in what sequence certain transactions become journaled as part of the Blockchain is described. The time-stamped verification of the data event journaling; receiving at least one request to include a non-specific number of transactions, each with additional data as a new time-sequenced block on the Blockchain; using criteria that includes at least one processor generated period of time, or a settable number of transactions received to determine how many transactions go into a new block; and adding results from each of the independent tasks as the new block on the Blockchain. This time sequenced Blockchain activity takes place on both the Device Chain level and Event Chain level of each data event or transaction depending on the configuration of the data within a Smart Contract (definition of SC) mechanism.

In another embodiment of the disclosure, a time sequencing based on inter-dependencies between the number of journaled transactions on the Device Chain and Event Chain, or Multi-Chain platform is described.

In another embodiment of the disclosure, a data transaction defined by a smart contract configuration are both recognized by the node device chain and the node data event ledger including the event chain.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter.

DETAILED DESCRIPTION OF DISCLOSURE

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

As used herein, the terms "blockchain processor", "computer", "system" and "node" are not limited to ICs (integrated circuit) referred to in the art as a computer, but broadly refers to a microcomputer, microcontroller, an application specific integrated circuit, and other programmable circuits, and these terms are used interchangeably herein.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system, or a printer circuit board. Embodiments within the scope of the present disclosure include program products comprising machine readable media for carrying or having machine-executable instructions or data structures stored thereon. Such machine-readable media can be any available media that can be accessed by a general purpose or special purpose computer or another machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or another machine with a processor. When information is transferred, or provided over a network or another communications connection (either hardwired, wireless, or a combination of hardwired or wireless) to a machine, the machine properly views the connection as a machine-readable medium. Thus, any such connection is properly termed a machine readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Figure 1:
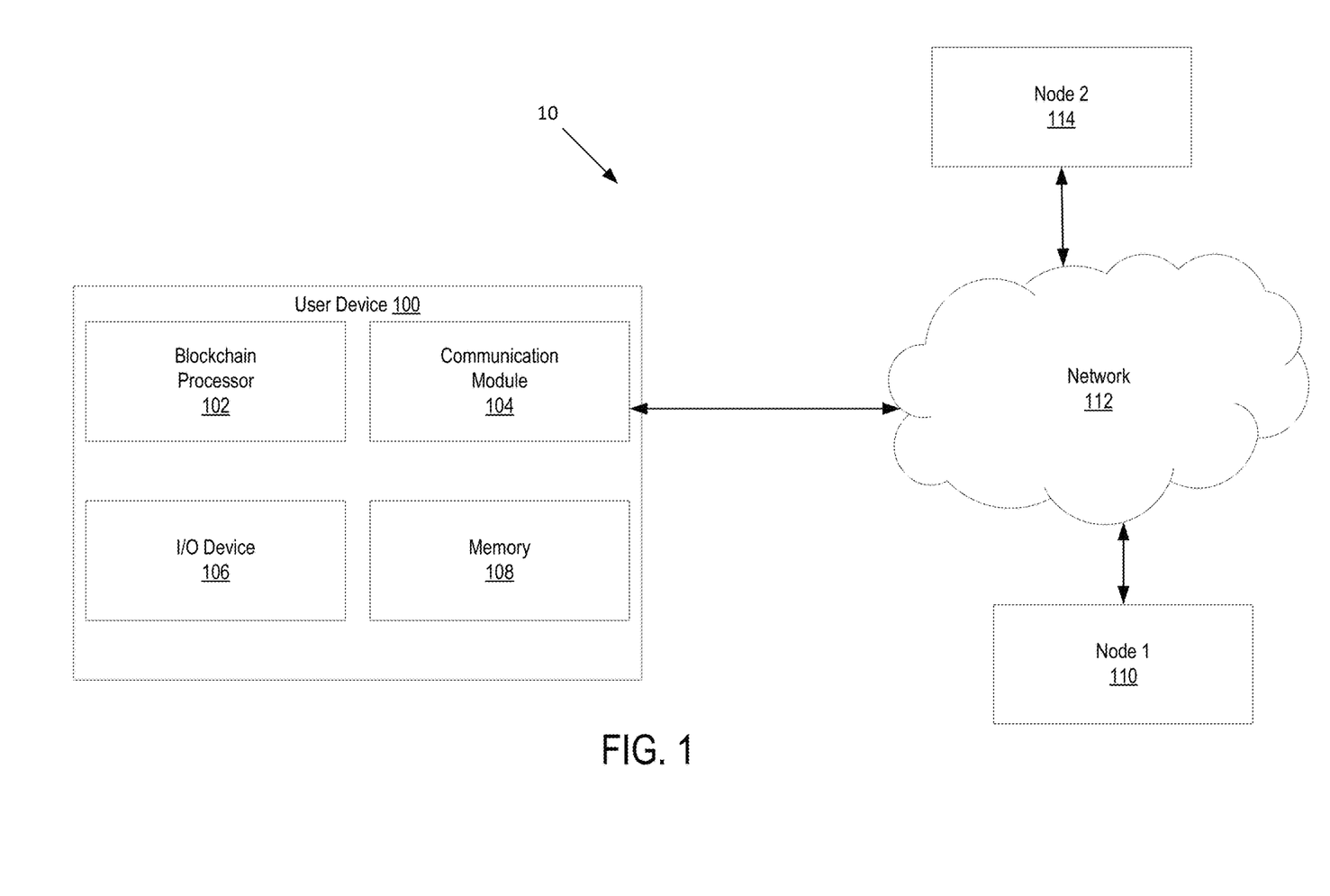
FIG. 1 illustrates an overview of a user device and blockchain network.

FIG. 1. is a schematic of an exemplary blockchain system 10 that includes a user device 100, a network 112, a node 1 110, and a node 2 114. Blockchain system 10 can be a set of hardware component that remotely located or co-located. Blockchain system 10 is capable of managing data such as transaction history or log of values associated with given accounts.

The user device 100 includes a blockchain processor 102, a communication module 104, an I/O device 106, and a memory 108. The user device 100 is capable of sending data files to the network 112. The user device 100 processes input information from the I/O devices 106 and communicates with the network 112.

The blockchain processor 102 has a processing device but is not limited to computing device, microcomputer, micro-controller, a programmable logic controller (PLC), an application specific integrated circuit, and any other programmable circuits. The system 100 is designed to share and synchronous time series identification. The system 100 matches the hardware clock-generating signal of the blockchain identified node device with the generated data event time stamp. The blockchain processor 102 may store the data for entry and the metadata (including the hash of the previous block and the row address of the data in the previous block). Blockchain processor 102 collects data from database of the user devices. The processor 102 generates period of time and adding results from each of the independent tasks as the new block on the blockchain. The database includes end-user database but not limited to centralised database, operational database, commercial database, personal database and distributed database.

Communication Module 104 establishes and verify connection between user device and network 112. Communication module 104 can be a part of user device 100 or it can be separate module. The communication module 112 includes various standards and protocols like Ethernet, EtherCAT, PROFINET, PROFIBUS DP, CANopen, DeviceNet, Modbus TCP, Modbus RTU, RCOM, Serial, ABB CS31 but not limited to other communication protocol and standard.

I/O device 106 collects information from the user and sends to memory 108. User device 100 shares data files, blocks and transactions to nodes 114, 110 via network 112 through communication module 104. Communication module 104 is responsible for secure data transfer. User device 100 also includes I/O device 106. I/O device 106 includes sensors, peripheral devices but not limited to any hardware, software or a human information processing system.

Memory 108 includes machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or another machine with a processor.

User device 100 is connected to network 112. Network 112 is set of connected nodes and user device. Network 112 uses different topology in order to connect various nodes. A data file shared by all computing nodes participating in a system based on a blockchain design pattern protocol. Network 112 includes PAN, LAN, MAN, WAN, SAN, EPN, VPN, but not limited to any other types of network.

Figure 2:
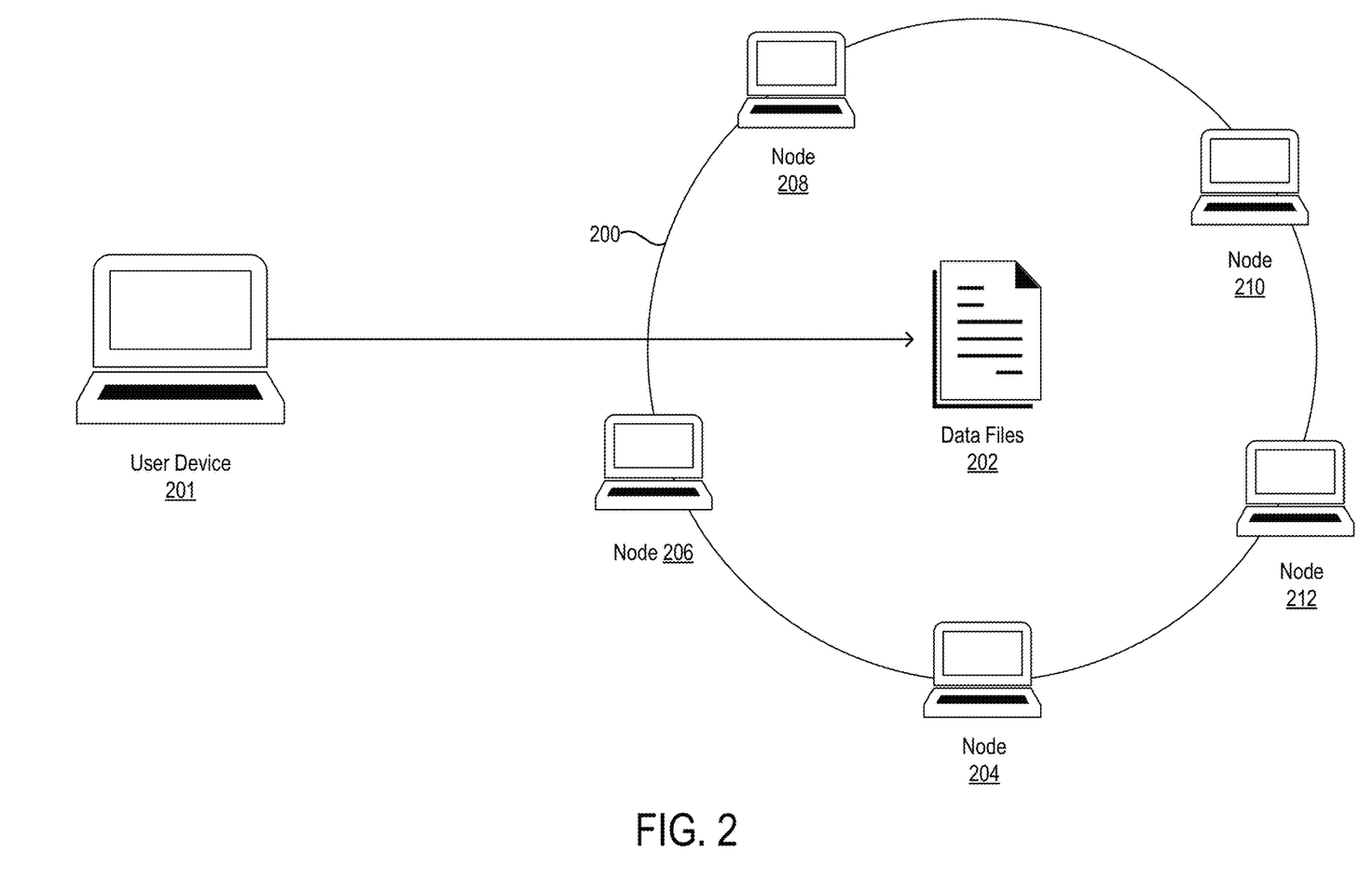
FIG. 2 illustrates a data files sharing method.

Blockchain is a public or privately shared ledger of all transactions, where nodes 114, 110 are connected in linear and chronological order. The specific number of nodes are not limited. The system 100 for the shared and synchronous time series identification that matches the hardware clock-generating signal of the blockchain identified node device 114, 110 with the generated data event time stamp and shared by all computing nodes 114, 110 participating in a complete system based on a blockchain design pattern and protocol Referring to FIG. 2, FIG. 2. illustrates sharing method of datafiles 202 from user device 201. In an exemplary embodiment, nodes are connected in chronological order 200. The datafile 202 including transactions and blocks, where the transactions are data to be stored in the blockchain and the blocks are records that confirm when, by time signal, and in what sequence certain transactions become journaled as part of the blockchain 200 is described. Datafiles 202 is shared with all nodes 204, 206, 208, 210. 212. Number of nodes is not limited.

Figure 3:
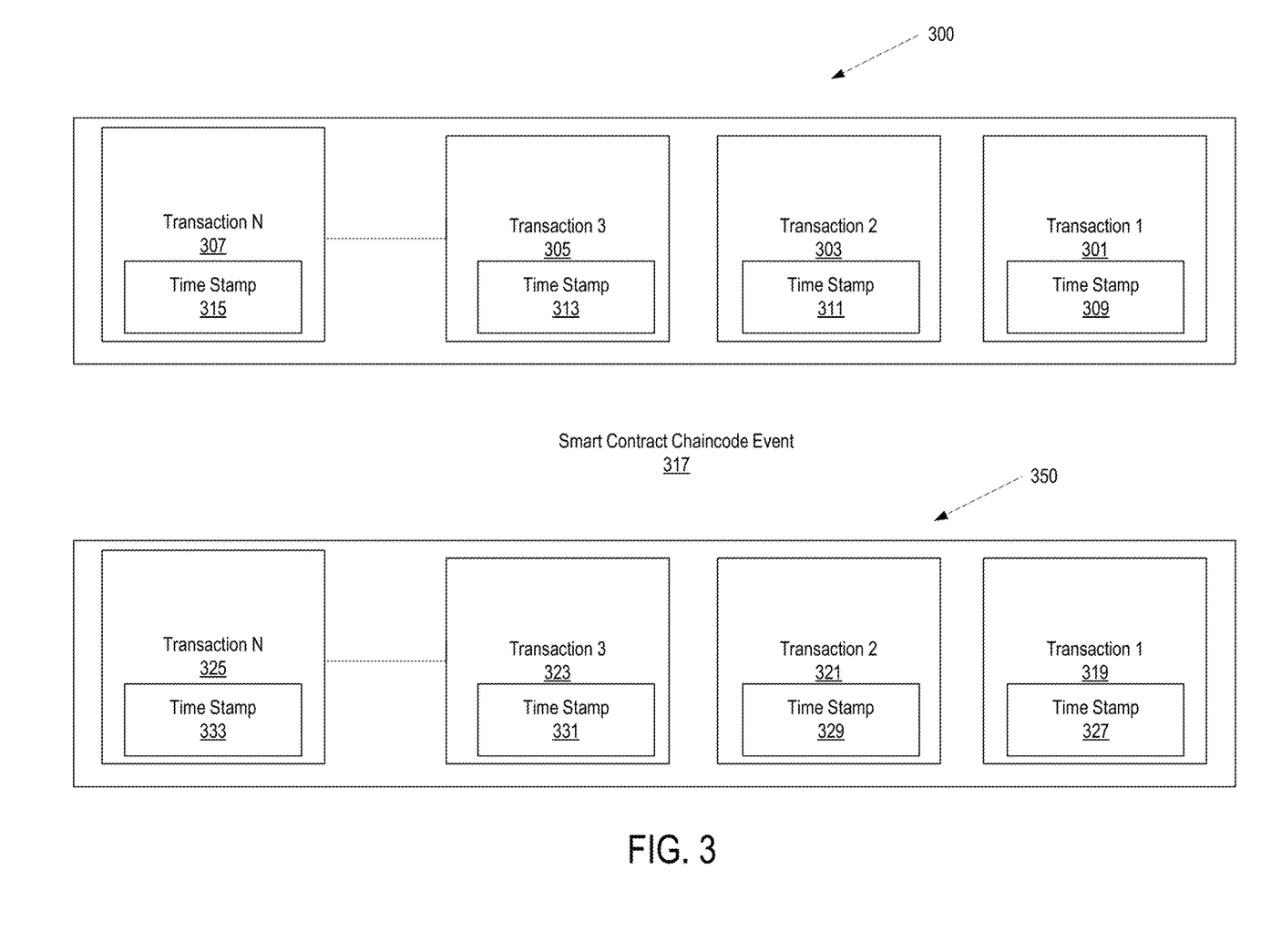
FIG. 3 illustrates a single block of the blockchain.

FIG. 3 illustrates blocks 300 of a blockchain structure of the blockchain 200. The blockchain of blocks 301, 303, 305, 307 is a device chain, whereas blockchain of blocks 319, 321, 323, 325 is an event chain 350. In an embodiment, the device chain and the block chain are synchronized with each other. The time-stamped 309, 311, 313, 315 verification of the journaling includes receiving at least one request to include transactions 301, 303, 305, 307 each with additional data as a new time-sequenced block 300 on the blockchain. Further, the verification method is using criteria that includes processor 102 generated period of time and adding results from each of the independent tasks as the new block on the blockchain. In the example, the period of time is settable number of transactions 301, 303, 305, 307 received to determine how many transactions go into a block 300. This time sequenced blockchain activity takes place on both the device chain level and event chain level of each data event or transaction depending on the configuration of the data within a smart contract mechanism. The time sequencing based on inter-dependencies between the number of journaled transactions on the device chain and event chain, or multi-chain platform. In various embodiments, the smart contract chaincode (chaincode is possibly bound to the hyperledger application under copyright/may also be fully public license access—observation) event 317 may allow the two block chains 300 and 350 to be synchronized on an as needed basis. The smart contract chaincode event 317 stores additional information regarding the devices and policies of the system as a whole.

A blockchain cybersecurity system time signature is applied to synchronize the device level ID, or device chain, this time sync is matched to the client master clocking time signal governing data transactions on the data event level, or event chain. The combination of these two disparate blockchain mechanisms is termed a multi-chain application. The matched time signals now provide referenced smart contract time sequencing. This matched time sequencing is unique and custom in its application to a multi-chain block chain cyber security application.

Figure 4:
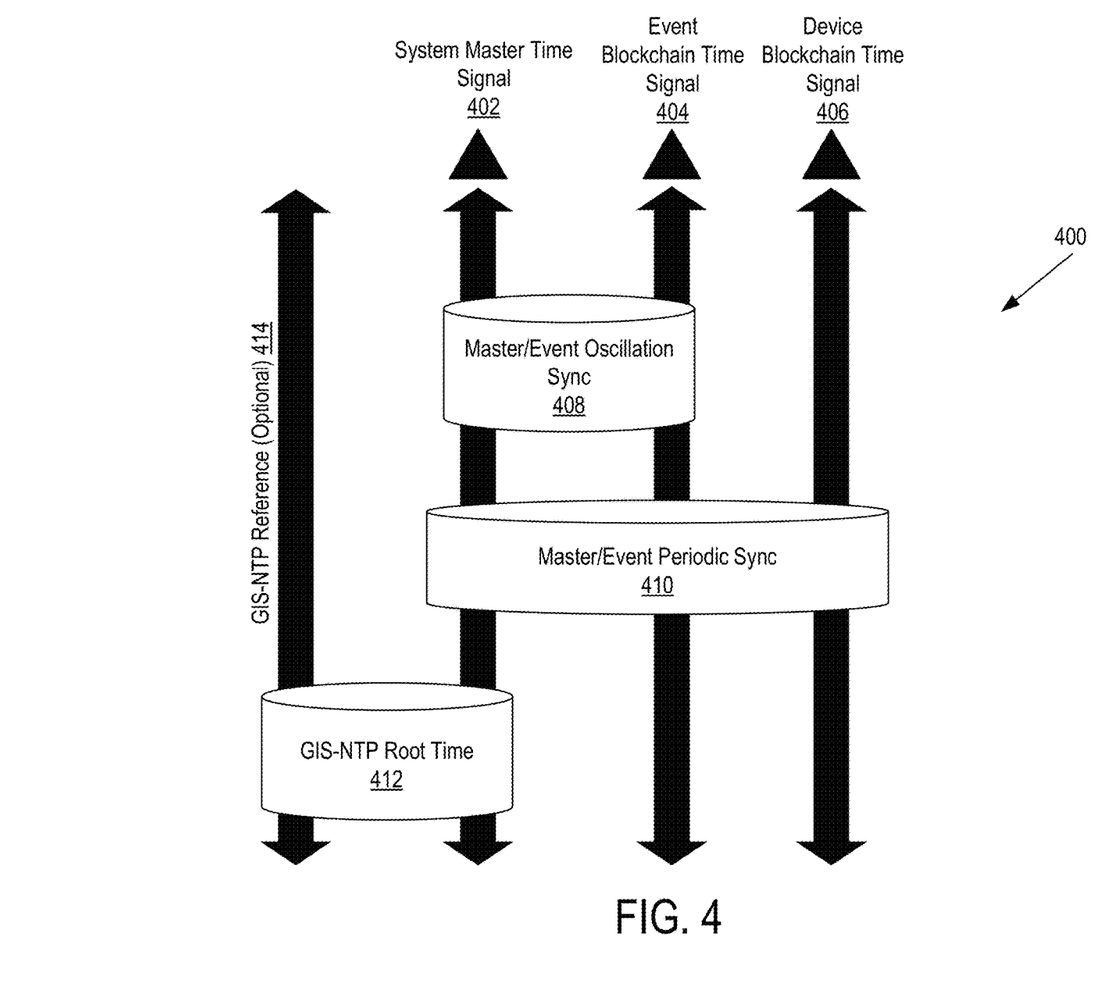
FIG. 4 illustrates a method of time synchronization.

FIG. 4 illustrates a method 400 of time synchronization. GIS-NTP 412 is the root time. GIS is the geographic information system which captures, stores, manipulates geographical data. The system 100 and nodes of blockchain use NTP. The NTP (Network Time Protocol) is a TCP/IP protocol. NTP is used to sync the user system 100 and the various nodes of the blockchain. With NTP and GIS, the system 100 can sync the geographic information, and share the information in the blockchain. However, GIS-NTP references 414 may be optional. System master time signal 402, event blockchain time signal 404, device blockchain time signal 406 are the three-time signals needed to be synchronized. In some embodiments, the system master time signal 402 synchronizes with GIS-NTP reference 414 at GIS-NTP Root Time 412. Synchronization between system master time signal 402, event blockchain time signal 404, device blockchain time signal 406 is the master/event periodic sync 410 may also be performed. Further, synchronization between event blockchain time signal 404, device blockchain time signal 406 is performed by the master/event oscillation sync 408.

Given the requirement for a comprehensively accurate and sustained time signal matched between the application (the master clock) and the signal/data management system (the blockchain reference clock(s)), the MCT (Multi-Chain Time) Sync implements a customized time protocol styled after the IEEE 1588-2008 Precision Time Protocol root timing reference, yet without the use of a specific grandmaster clock or any GPS external signalling. Instead, the MCT (Multi-Chain Time) Sync utilizes a new method of time synchronization protocol design specifically for use in the Multi-Chain blockchain system environment. There are three-time signal strata involved in the MCT Sync mechanism: Device chain time—Beachhead time signal, Event chain time or Blocklock time signal, Implementation or Client master clock—master clock signal.

Figure 5:
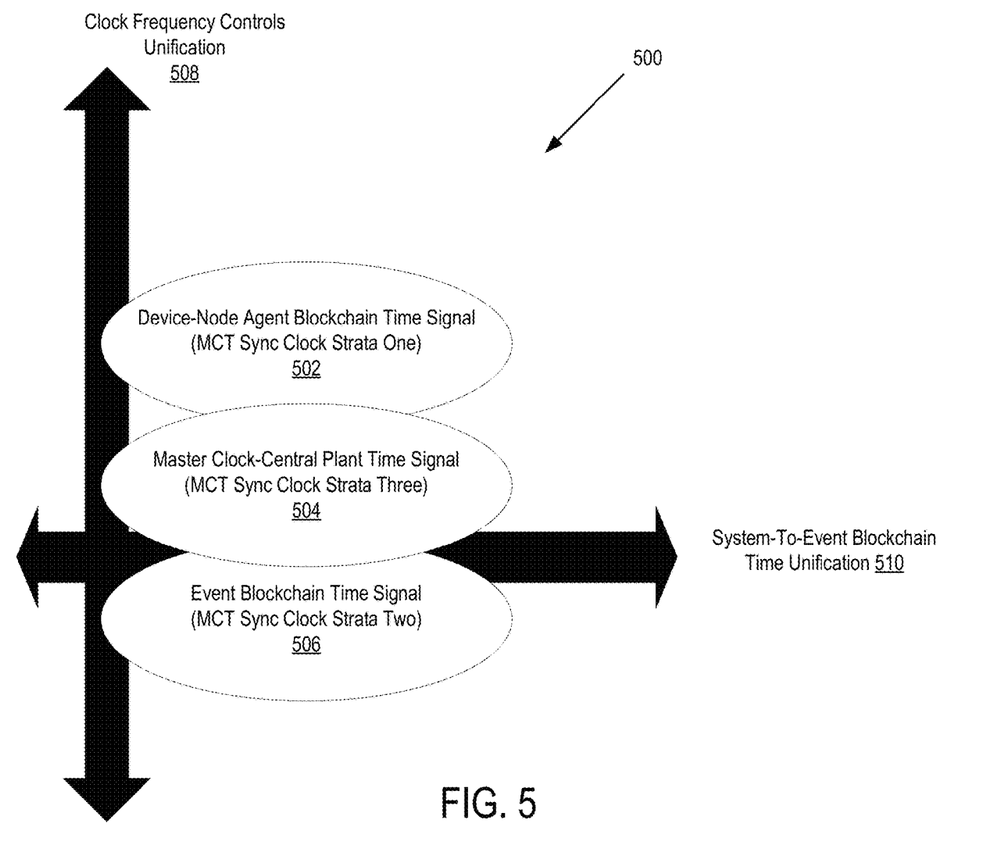
FIG. 5 illustrates time signals between frequency control and time unification.

FIG. 5 illustrates time signals between frequency control and time unification. The y-axis is clock frequency controls unification 508, x-axis is system-to-event blockchain time unification 510. There are three-time strata as illustrated, device node agent blockchain time signal 502, event blockchain time signal 506, master clock-central plant time signal 504.

By using a continuous sequence of integrated time protocol sync, management and clock signaling messaging between the three-time signal strata 502, 504, 506, the MCT Sync achieves unified time series performance which is operational in both forward and backward compatibility modes, unlike the typical PTP standards. Backward time compatible systems are also an intrinsic benefit of the blockchain multi-chain MCT Sync application. Mission critical system performance and system search and recovery modes in a blockchain environment are only possible via backward time sequencing.

Further, the MCT Sync mechanism uses the three separate yet integrated time stratas 502, 504, 506 to occupy a specialized role that also exceeds the immediate environment capabilities of the popular Network Time Protocol (NTP), in that it can be isolated from the greater system network and retain referenced accuracies pending interruptions or unexpected failures that allow for an islanded operation.

Figure 6A:
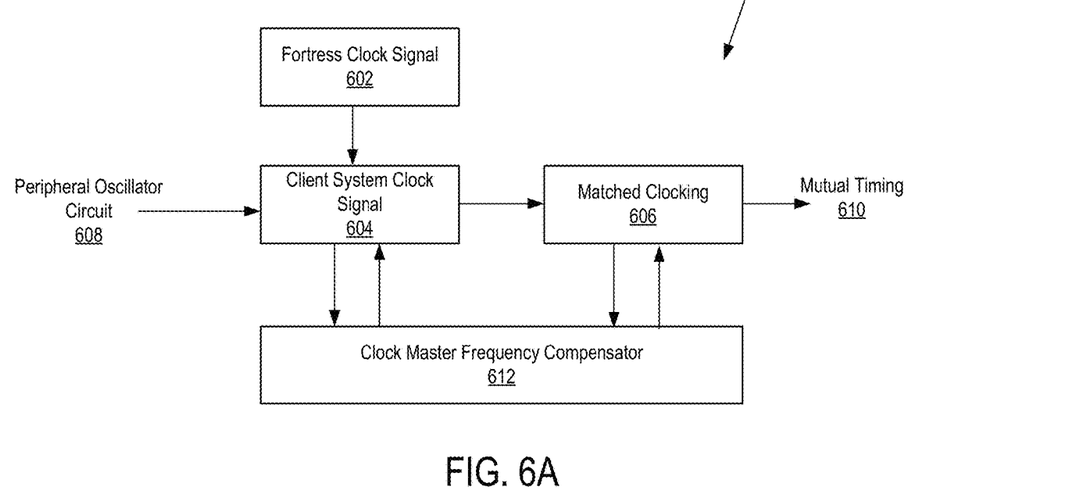
FIG. 6A illustrates a system clock diagram.

FIG. 6A illustrates a system 600 that includes a fortress clock signal 602, a client system clock signal 604, a matched clocking 606, a peripheral oscillator circuit 608, a mutual timing 610 and a clock master frequency compensator 612.

Figure 6B:
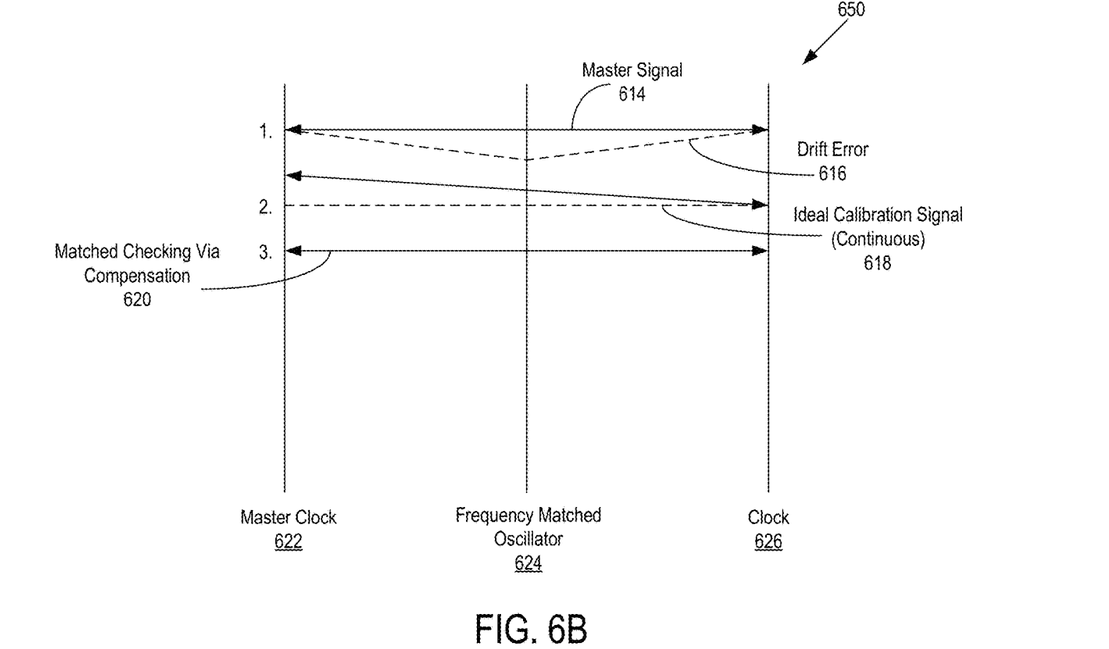
FIG. 6B illustrates a signal flow diagram.

FIG. 6B illustrates a process flow diagram that includes a master clock 622, a frequency matched oscillator 624, a clock 626. Initially at step 1, a master signal 614 may be sent from the master clock 622 to the clock 626. The clock 626 may correct for drift error 616. Next, at step 2 the ideal calibration signal 618 may be sent from the master clock 622 and received by clock 626. Next at step 3, the matched checking via compensation signal 620 may be sent from the master clock 622 to the clock 626. One or more of the signals may be sent via the frequency matched oscillator 624 or by the frequency matched oscillator 624.

Figure 7:
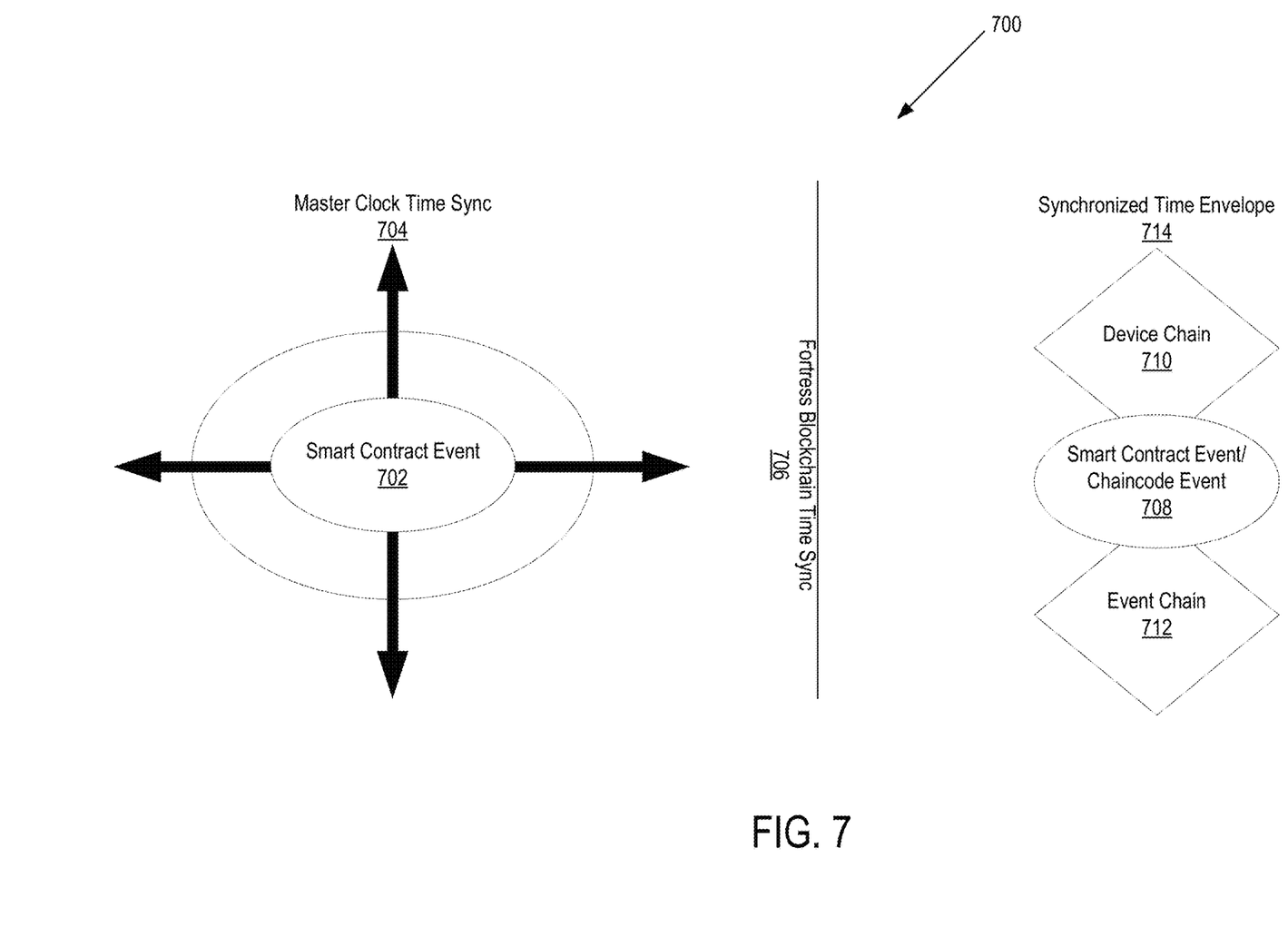
FIG. 7 illustrates a system clock diagram.

FIG. 7 illustrates a system clock diagram 700. The clock diagram 700 includes a smart contract event 702 that may be sent to the master clock time system 704. The fortress blockchain time sync 706 may communicate with the synchronized time envelope 714. The synchronized time envelope 714 may include device chain 710, event chain 712, and smart contract event/chaincode event 708.

Figure 8:
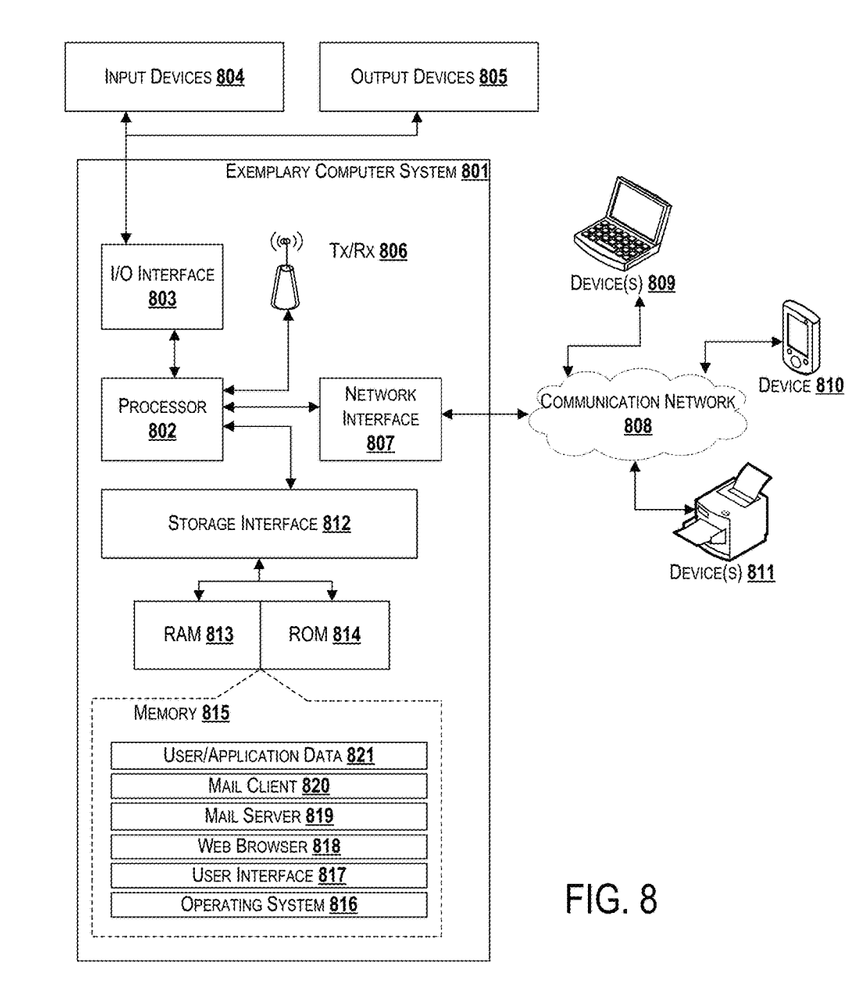
FIG. 8 illustrates a simplified block diagram of an exemplary computer system.

FIG. 8 is a block diagram of an exemplary computer system for implementing embodiments consistent with the present disclosure.

Variations of computer system 801 may be used for implementing all the computing systems that may be utilized to implement the features of the present disclosure. Computer system 801 may comprise a central processing unit ("CPU" or "processor") 802. The computer system 801 may be a master node, in one example. The processor 802 may comprise at least one data processor for executing program components for executing user- or system-generated requests. The processor 802 may include specialized processing units such as integrated system (bus) controllers, memory management control units, floating point units, graphics processing units, digital signal processing units, etc. The processor 802 may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver 806 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface 807 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 501 may communicate with devices 809, 810, and 811. These devices 809, 810 and 811 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface 812 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 815 may store a collection of program or database components, including, without limitation, an operating system 816, a user interface application 817, a web browser 818, a mail server 819, a mail client 820, user/application data 821 (e.g., any data variables or data records discussed in this disclosure), etc. The operating system 816 may facilitate resource management and operation of the computer system 801. Examples of the operating system 816 include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface application 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser 818 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. The web browser 818 may utilize facilities such as AJAX, DHTML, Adobe Flash, JavaScript, Java, application programming interfaces (APIs), etc. In some embodiments, the computer system 801 may implement a mail server 819 stored program component. The mail server 819 may be an Internet mail server such as Microsoft Exchange, or the like. The mail server 819 may utilize facilities such as ASP, ActiveX, ANSI C++/C#, Microsoft .NET, CGI scripts, Java, JavaScript, PERL, PHP, Python, WebObjects, etc. The mail server 819 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client 820 may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A method for a blockchain smart contract time envelope, comprising:
    accessing, by a processor, a data file shared by one or more computing nodes participating in a blockchain system comprising two or more blockchains, wherein the data file comprises plurality of transactions and plurality of blocks;
    storing one or more transactions in the blockchain system;
    recording a sequence of the plurality of transactions journaled on the blockchain system;
    receiving, by the processor, a time signal from a master clock;
    calibrating the time signal from the master clock to establish a synchronized time signal; and
    storing the synchronized time signal in the two or more blockchains of the blockchain system for each of the one or more transactions;
    wherein a block of the plurality of blocks comprises a time-stamped verification record of the plurality of transactions journaled on the blockchain system;
    wherein the time-stamped verification record of the plurality of transactions journaled on the blockchain system, comprises:
    receiving at least one request to include the plurality of transactions, each with additional data as a new time-sequenced block on the blockchain system;
    using criteria that includes at least one processor generated period of time or a settable number of transactions received to determine how many transactions go into a new block; and
    adding results from each of an independent task as the new block on the blockchain system.

2. The method as claimed in claim 1, wherein a time sequenced blockchain activity takes place on both a device chain level and an event chain level of each data event or transaction depending on a configuration of a data within a smart contract system.

3. The method as claimed in claim 2, wherein a time sequencing based on inter-dependencies between a number of journaled transactions on a device chain and event chain, or multi-chain platform.

4. The method as claimed in claim 3, wherein an independent task is executed at a same time signal stamp.

5. The method as claimed in claim 3, wherein an independent task is executed in parallel as separate blockchain event ledgers.

6. The method as claimed in claim 3, wherein a data transaction defined by a smart contract configuration are both recognized by a node device chain and a node data event ledger.

7. The method as claimed in claim 1, wherein the adding results from each of the independent tasks as the new block on the blockchain includes adding a new block that records a new transaction with a time stamp in the blockchain system.

8. The method as claimed in claim 1, wherein the adding results from each of the independent tasks as the new block on the blockchain includes adding a block that records the new transaction with a transaction signature in the blockchain system.

9. A system for a blockchain smart contract time envelope, comprising:
- a processor, for accessing a data file shared by one or more computing nodes participating in a blockchain system comprising two or more blockchains, wherein the data file comprises plurality of transactions and plurality of blocks, the processor coupled to a memory with instructions that, when executed, cause the processor to perform:
- storing one or more transactions in the blockchain system;
- recording a sequence of the plurality of transactions journaled on the blockchain system
- receiving, by the processor, a time signal from a master clock;
- calibrating the time signal from the master clock to establish a synchronized time signal; and
- storing the synchronized time signal in the two or more blockchains of the blockchain system for each of the one or more transactions;
- wherein a block comprises a time-stamped verification record of the plurality of transactions journaled on the blockchain system;
- wherein the time-stamped verification record of the plurality of transactions journaled on the blockchain system, comprises:
- receiving at least one request to include the plurality of transactions, each with additional data as a new time-sequenced block on the blockchain system;
- using criteria that includes at least one processor generated period of time or a settable number of transactions received to determine how many transactions go into a new block; and
- adding results from each of an independent task as the new block on the blockchain system.

10. The system as claimed in claim 9, wherein storing the synchronized time signal comprises storing the synchronized time signal in a device chain and an event chain of the blockchain system.

11. The system as claimed in claim 9, wherein the instructions comprise a smart contract that executes based on the synchronized time signal.

12. The system as claimed in claim 11, wherein execution of the smart contract is based on matching the synchronized time signal between the two or more blockchains.

13. The system as claimed in claim 9, wherein the instructions further cause the processor to perform sending a signal to the master clock responsive to a smart contract event, prior to receiving the time signal from the master clock.

* * * * *